United States Patent [19]

Kawaguchi et al.

[11] Patent Number: 4,834,137
[45] Date of Patent: May 30, 1989

[54] SAFETY DEVICE FOR VESSELS OF COMPRESSED GASES

[75] Inventors: Toshiaki Kawaguchi, Osaka; Tsutomu Sasaki, Takarazuka; Takaaki Fukumoto, Kishiwada; Yutaka Funada, Takarazuka; Isao Kubota, Nishinomiya; Masaharu Hama, Itami; Nobuyoshi Terada, Kawanishi, all of Japan

[73] Assignee: Mitsubishi Denki Kabushiki Kaisha, Japan

[21] Appl. No.: 239,764

[22] Filed: Sep. 2, 1988

[30] Foreign Application Priority Data

Sep. 9, 1987 [JP] Japan ................. 62-225552

[51] Int. Cl.$^4$ ............................................. F16K 37/00
[52] U.S. Cl. ................... 137/557; 137/312; 137/382.5; 251/291; 73/40
[58] Field of Search .............. 73/40, 40.5 R; 137/382, 137/382.5, 312, 551, 557; 220/85 P; 251/291

[56] References Cited

U.S. PATENT DOCUMENTS

| | | | |
|---|---|---|---|
| 1,606,715 | 11/1926 | Miller | 137/382 |
| 2,954,797 | 10/1960 | Dryer | 137/312 |
| 3,323,541 | 6/1967 | Schneider et al. | 137/382 |
| 3,528,447 | 9/1970 | Kolb | 73/40.5 R |
| 3,907,616 | 9/1975 | Wiemer | 437/173 |
| 4,478,345 | 10/1984 | Edinger | 137/382 |
| 4,524,608 | 6/1985 | Bellefeville et al. | 73/40.5 R |
| 4,532,120 | 7/1985 | Smith et al. | 423/210 |
| 4,637,423 | 1/1987 | Gray | 137/382.5 |

FOREIGN PATENT DOCUMENTS

| | | | |
|---|---|---|---|
| 978221 | 11/1950 | France | 73/40 |
| 55-18971 | 2/1980 | Japan | |
| 59-90698 | 6/1984 | Japan | |
| 61-96352 | 6/1986 | Japan | |
| 604229 | 8/1960 | United Kingdom | 137/312 |

Primary Examiner—A. Michael Chambers
Attorney, Agent, or Firm—Leydig, Voit & Mayer

[57] ABSTRACT

A safety device for vessels of compressed gases is disclosed which comprises a cap enclosing the valve of the vessel, a port formed in the wall of the cap for passing a nozzle attached to the valve, a handling member for rotating the handle of the valve from outside of the cap, purge gas introducing and exhausting ports formed in the wall of the cap, and a detector disposed in the middle of an exhausting pipe coupled to the purge gas exhausting port. The handling member comprises a shaft vertically extending through and slidably supported by the ceiling of the cap, a horizontal disk secured to the lower end of the shaft, and four circumferentially equally spaced vertically extending fingers fixedly secured to the circumferential portion of the lower surface of the disk, which disengagably engage with the grooves formed on the circumference of the handle. The cap is divided into bell-shaped upper half and hollow cylindrical lower half which abut at a horizontal plane passing through the axis of the port for the nozzle letting out the gas from the valve. Alternatively, the fingers may be bent inwardly and rotatably secured to the horizontal disk of the handling member. In this case, the inwardly bent portions of the fingers are held together by an annular clip to engage the straight portions of the fingers with the grooves of the handle of the valve, and the cap is divided into right and left symmetric halves which are detachably coupled together at a vertical plane passing through the axis of the cap.

10 Claims, 5 Drawing Sheets

SAFETY DEVICE FOR VESSELS OF COMPRESSED GASES

BACKGROUND OF THE INVENTION

1. Field of the Invention

This invention relates to safety devices for bombs, or vessels for compressed gases, which enable the operator to open and close the valve of the bomb containing a poisonous, or an inflamable or ignitable gas without incurring danger.

2. Description of the Prior Art

A poisonous, or an inflammable or ignitable gas contained in a bomb, i.e., a cylindrical vessel for compressed gases with a gas flow regulating valve, is often used in the industry. For example, arsines, phosphines, silanes, and diborane, which are extremely poisonous, and inflammable or ignitable, are used in the production of semiconductor devices. Thus, leakage of small quantity of these gases may entail grave results: the opening and closing operation of the valve of the bomb containing these gases is accomplished by great dangers.

In former years, safety devices for the bombs for detecting the presence of leaking gas have already been proposed; to date, however, none which enables the operator to open and close the valve of the bomb safely.

Japanese laid-open utility model application 59-90698, for example, teaches a protector cap for the vessels of poisonous gases for ensuring safety during the transportation of the bombs. The protector cap comprises a cover having the form of an inverted cup which is attached to the top of the bomb, a detector tube disposed at the ceiling of the cover which comprises a detector agent observable from without, an antidotal agent disposed in the cover, and an antidotal cylinder disposed in the cover and having a gas introducing port and a gas exhausting port which communicates with the exterior.

The protector cap taught in this Japanese utility model application, however, has following disadvantages. First, it is designed solely to detect and treat the leaking gas during the transportation, and no regard is paid to the safety during the opening and closing operation of the valve which becomes necessary when the gas is utilized in a factory. Second, the detection of the leaking as is effected only qualitatively, not quantitatively. Third, as the time point at which the antidotal agent loses the antidotal efficiency is not readily recognizable, there is a danger that the operator keeps on using the antidotal agent which has already lost its effects. Fourth, until the pressure of the leaking gas in the cover reaches a certain level, the leaking gas does not flow into the antidotal cylinder. Fifth, when the leaking late of the gas is high, the antidotal agent may not be enough to counteract the poisonous gas. Sixth, the exterior air may flow into the antidotal cylinder through the gas exhausting port which is open to the exterior space, so that if the bomb contains an ignitable gas, the danger that the leaking gas catch fire is not completely eliminated.

Japanese utility model application 61-96352, on the other hand, teaches an oxygen detecting cap for oxygen bombs, which comprises a main body of the cap hermetically fitted around the oxygen extracting portion of the oxygen bomb, in which a deoxygenating agent and an oxygen detecting agent are disposed.

The cap taught by this Japanese utility model application suffers following disadvantages. First, it is designed solely to detect and treat the leaking gas during transportation or storage time thereof, and no regard is paid to the safety of the opening and closing operation of the valve during the time in which the gas is utilized. Second the detection of the leaking gas is effected only qualitatively and not quantitatively. Third, as the leakage of the gas is detected by the changing color of the detector agent, a small quantity of leaking gas may be overlooked. Fourth, although the oxygen gas leaking into the main body of the cap is gradually removed by the deoxygenating agent, the leaking oxygen gas remaining in the main body of the cap may be diffused to the exterior when the main body of the cap is removed from the bomb. Thus, the cap is not applicable to vessels containing gases utilized in the production of semiconductor devices, which are highly harmful to human body even in small quantity or are ignitable when they come into contact with air.

Further, Japanese laid-open patent application 55-18971 teaches a detector device for radioactive leaking gas, which comprises a retrieving hood covering the whole storage vessel sealing a radioactive substance therein, and a sampling pipe which supplies the radioactive leaking gas retrieved by the hood to a detector.

The detector device taught by this Japanese patent application suffers the disadvantage that, although it is possible to recognize which vessel is leaking during storage time, no means is provided for the safety when the gas in the vessel is used. The device also suffers the disadvantage that it is cumbersome and difficult to handle because the retrieving hood covers the whole storage vessel.

Thus, conventional safety devices for the bombs are only effective to detect and counteract the leaking gas during transportation or storage time of the bomb; the opening and closing of the valve of the bomb cannot be effected without removing the protector cap enclosing the valve of the bomb. Therefore, in cases in which the gas contained in the bomb is poisonous, or inflamable of ignitable great danger may accompany the opening and closing operation of the valve of the bomb. Namely, when the protector cap is removed from the top of the bomb to operate the valve when the gas in the bomb is to be used, the leaking gas which may be present in the protector cap is diffused to the exterior space. Further, as no safety means is provided during the time when the gas is used, the valve may fail on repeated opening and closing operations after the cap is removed, so that the gas is leaked and diffused therefrom. In both these cases, the diffusion of the poisonous, or inflammable or ignitable gas may harm the operators or cause a fire.

SUMMARY OF THE INVENTION

Thus, a main object of the present invention is to provide a safety device for the bombs containing a poisonous, or inflammable or ignitable gas, which enables the operator to open and close the valve of the bomb, by hand or by remote control operation, without removing the protector cap enclosing the valve of the bomb.

A further object of the present invention is to provide such safety device which ensures safety even when the gas is leaked after repeated operations of the valve of the bomb.

A still further object is to provide a safety device which is simple in construction and can be easily attached to the bomb.

According to the present invention, a safety device for a vessel of compressed gases is provided, wherein the vessel comprises a cylindrical bottle containing a compressed gas and a valve secured to a top of the bottle to regulate a gas flow from the bottle; the safety device according to the present invention comprises: enclosing means including a cap adapted to enclose the valve therein and to be detachably secured to the bottle; a port formed in a wall of the cap for passing a nozzle or a tube attached to the valve; handling member for adjusting a rotational position of the handle of the valve from outside of the cap, which comprises engaging means for engaging with the handle of the valve and a shaft fixed to said engaging means and extending from inside to outside of said cap; purge gas introducing means for introducing a purge gas into the interior of the cap; and purge gas exhausting means for exhausting the purge gas from the interior of the cap.

It is preferred that a detector for detecting the presence of the compressed gas in exhausted purge gas is provided in the purge gas exhausting pipe.

BRIEF DESCRIPTION OF THE DRAWINGS

Further features and details of the present invention will become more clear in the following detailed description of the preferred embodiments taken in conjunction with the accompanying drawings, in which:

FIG. 1b is a plan view of the safety device of FIG. 1a;

FIG. 2b is a plan view of the safety device of FIG. 2a;

In the drawings, like reference numerals represent like or corresponding parts or members.

DETAILED DESCRIPTION OF THE PREFERRED EMBODIMENTS

Figure 1A:
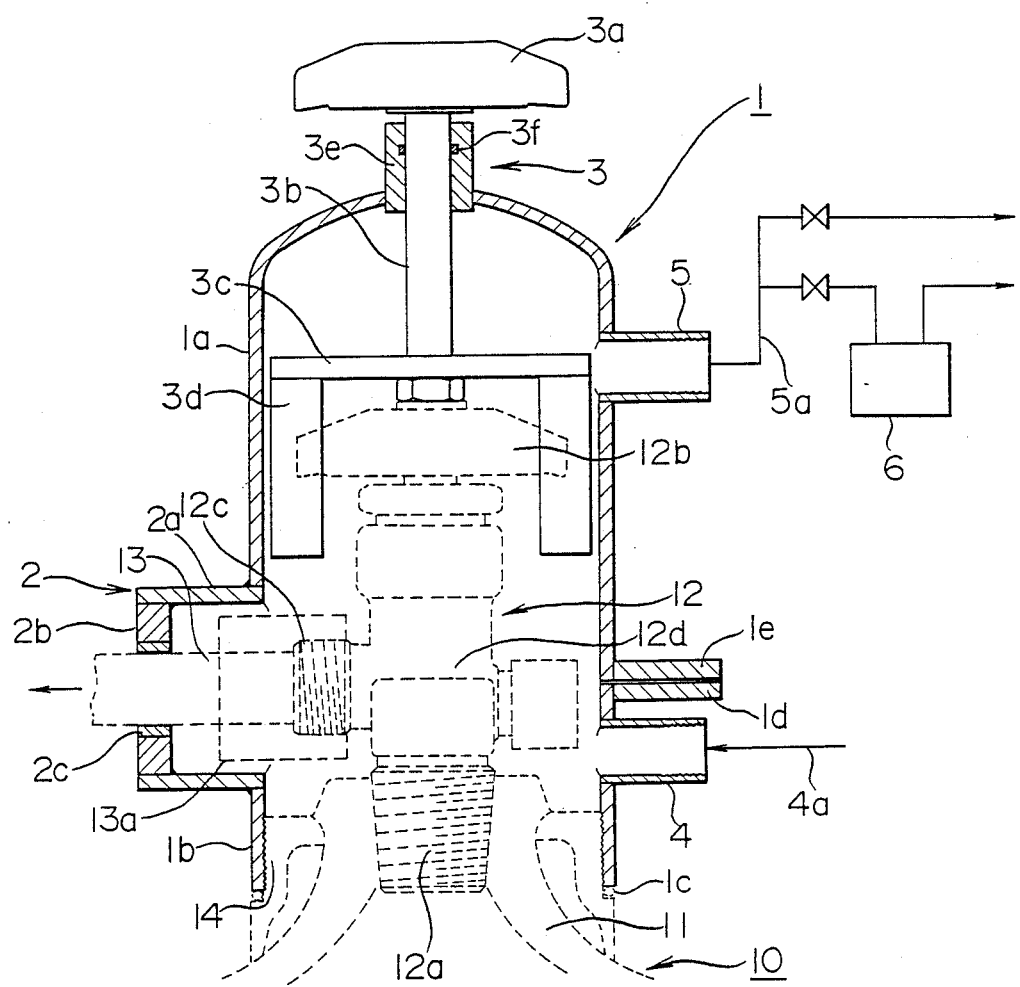
FIG. 1a is an elevational sectional view of a safety device according to the present invention, showing a schematically synthesized cross section thereof along the lines A—A' and A—A" of FIG. 1b.
Figure 1B:
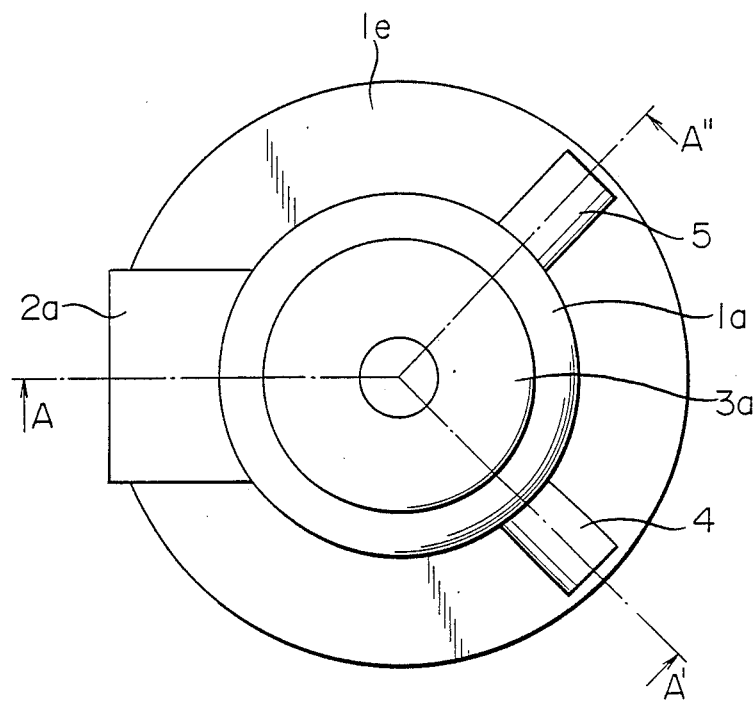

Referring now to FIGS. 1a and 1b of the drawings, the first embodiment according to the present invention is described.

Before embarking upon a description of the safety device according to the present invention, the bomb, or the vessel for containing compressed gases, to which the safety device is attached, is described first. The bomb 10, a top portion of which is shown in dotted lines in FIG. 1a, comprises a cylindrical bottle 11 containing a compressed gas therein, and a valve 12 having a threaded bottom portion 12a which is screwed into a female thread formed on the inner surface of the opening at the top of the bottle 11. The valve 12 comprises a disk-shaped handle 12b having a plurality of circumferentially spaced, axially extending grooves, and an outlet port 12c at the side surface of the cylindrical body 12d of the valve 12. The port 12c forms an annular projection carrying a male thread on the outer circumferential surface thereof, to which a nozzle 13 for drawing out the gas in the bottle 11 is fixed by an attachment 13a. The flow of the gas through the valve 12 is controlled by the rotational position of the handle 12b. The bomb 10 further comprises an attachment member 14 which is fixed around the neck portion of the bottle 11 and carries a male thread on the upper portion of the outer circumferential surface thereof.

The safety device according to the bomb 10 containing a poisonous, or an inflammable or ignitable gas. Most important examples of the gas contemplated by the present invention are arsines, phosphines, silanes, and diborane, which are used in the production of semiconductor devices. However, the gas which may be contained in the bomb 10 is not limited thereto, and may be any one of the following gases:

arsenic compounds such as arsines (including arsenic trihydride), arsenic trifluoride, and arsenic pentafluoride;

phosphorus compounds such as phosphines (including phosphorus trihydride), phosphorus trifluoride, and phosphorus pentafluoride;

silicon compounds such as monosilane (silicon tetrahydride), disilane (disilicon hexahydride), trisilane (trisilicon octohydrice), dichlorosilane, trichlorosilane, silicon tetrachloride, triflurosilane, difluorosilane, monofluorosilane, silicon tetrafluoride, and desilicon hexafluoride;

boron compounds such as diborane, boron trichloride, and boron trifluoride;

germanium compounds such as germanes (including germanium tetrahydride);

antimony compound such as stibine (antimony trihydride;

selenium compunds such as hydrogen selenide;

tin compounds such as tin hydride;

tellurium compounds such as hydrogen telluride;

tungsten compounds such as tungsten hexafluoride;

molybdenum compounds such as molybdenum hexafluoride;

nitrogen compounds such as nitrogen monoxide, nitrogen dioxide, dinitrogen monoxide, nitrogen trifluoride, anmonia (nitrogen trihydride), and trimetylamine;

sulphur compounds such as sulphur tetrafluoride, sulphur hexafluoride, and hydrogen sulphide;

organometal compounds such as trimethylaluminum, triethylauminum, trimethylgallium, triethylgallium, trimethylindium, triethylindium, dimethylzinc, and diethylzinc;

halogens such as chlorine and fluorine;

hydrogen halides such as hydrogen chloride and hydrogen bromide;

hydrocarbons and halohydrocarbons such as methane, acetylene, carbon tetrachloride, tetrafluoromethane, trifluromethane, hexafluoroethane, pentafluorochloroethane and octofluoropropane; and other commonly used gases such as hydrogen, and carbon monoxide.

The safety device shown in FIGS. 1a and 1b, which is attached to the bomb 10, comprises a bell-shaped cap 1 for enclosing and hermetically sealing the valve 12 of the bomb 10 therein. A port 2 is formed on the side wall of the cap 1 for letting out the nozzle 13. The safety device further comprises a handling member 3 for rotating and adjusting the rotational position of the handle 12b of the valve 12 from outside of the cap 1. Further, purge gas inlet and outlet nozzles 4 and 5 are provided on the side wall of the cap 1 for introducing a purge gas into the interior of the cap 1 and for exhausting the gas in the interior of the cap 1 to detect a leakage of the compressed gas in the bottle 11 of the bomb 10.

The cap 1, which may be made of a corrosion-resistant metal such as stainless steel a metal lined with a corrosion resistant material such as TEFLON, or a fiber-reinforced resins such as FRP, consists of a bell-shaped upper portion 1a and a hollow cylindrical lower portion 1b. The lower portion 1b is screwed around the male thread of the attachment member 14 at the female thread formed on the lower portion of the inner circumferential surface thereof, an O-ring 1c being interposed between the end surface of the lower portion 1b of the cap 1 and the step formed on the outer circumferential surface of the attachment member 14. The O-ring 1c hermetically seals the interior from the exterior of the cap 1. Other gaskets such as square ring and plate-shaped packing may be used instead of the O-ring 1c between the lower portion 1b of the cap 1 and the attachment member 14 to ensure the hermetic sealing of the interior space of the cap 1 from without. An annular flange 1d is formed at the top end of the lower portion 1b of the cap 1, which abuts and is coupled to a corresponding annular flange 1e formed at the bottom end of the upper portion 1a of the cap 1, an annular plate-shaped packing (not shown) being interposed therebetween.

The port 2 for the nozzle 13 having the form of a radially extending short hollow cylinder 2a with an end plate 2b is formed on the side wall of the cap 1 at a location thereof at which the upper and lower portions 1a and 1b of the cap 1 meet. Thus, the cylinder 2a and the end plate 2b of the port 2 is divided into semi-circular upper and lower havles, which are integral with the upper and lower portions of the cap 1, respectively. The flanges 1e and 1d extend from the exterior circumferential surface of the cylinder 2a of the port 2, the abutting surfaces of the flanges 1e and 1d being flush with those of the upper and lower portions of the cylinder 2a and the end plate 2b of the port 2. The end plate 2b of the port 2 has a through hole with an annular sealing member 2c, for letting out the nozzle 13. Thus, when attaching the cap 1 to the top of the bomb 10, the lower portion 1b of the cap 1 is first screwed onto the attachment member 14, and, after attaching the nozzle 13 to the valve 12, the upper portion 1a of the cap 1 is positioned on top of the lower portion 1b, so that the flanges 1e and 1e' and the upper and lower portions of the port 2 are aligned as shown in FIG. 1a.

The handling member 3 comprises a disk-shaped handle 3a, a vertically extending shaft 3b fixed to the center of the handle 3a at the upper end thereof, a horizontal disk 3c fixed to the lower end of the shaft 3b, and four circumferentially equally spaced engaging fingers 3d which are fixed to the lower surface of the disk 3c at the upper end thereof to extend vertically downward therefrom. The shaft 3b slidably extends through the hollow cylindrical sealing member 3e fixed to the cap 1 at the center of the top dome of the upper portion 1a thereof. An O-ring 3f is provided in the annular groove formed on the inner circumferential surface of the cylindrical sealing member 3e to ensure the hermetic sealing. Before the upper portion 1a of the cap 1 is attached on top of the lower portion 1b thereof, the handle 3a is pulled upward to move the fingers 3d to a position at which the lower ends thereof are above the upper surface of the handle 12b of the valve 12. After the upper portion 1a is fixed on the lower portion 1b, the handle 3a is pushed downward to a position shown in FIG. 1a to engage the fingers 3d with the grooves formed on the circumference of the handle 12b of the valve 12. If the radial position of the fingers 3d are not in alignment with the grooves of the handle 12b and will not come into engagement therewith, the handle 3a of the handling member 3 is rotated slightly and is lowered again to put the fingers 3d into engagement with the grooves of the handle 12b. The adjustment of the rotational position of the handle 3d and the lowering thereof is repeated until the fingers 3d are successfully engaged with the grooves of the handle 12b. When the fingers 3d are thus in engagement with the grooves of the handle 12b, the rotational position of the handle 12b of the valve 12 can be adjusted by means of the handle 3a of the handling means from outside of the cap 1 sealing the valve 12 therein. The rotation of the handle 3a may be effected by hand or by an electric motor (not shown) through a remote control system.

The inlet and outlet nozzles 4 and 5 are preferred to be circuferentially and axially (i.e., vertically) spaced as shown in the figures, so that the gas leaking from the bottle 11 and the valve 12 into the interior of the cap 1 is mixed up with the purge gas introduced from the port 4 and is exhausted through from the port 5. The nozzles 4 and 5 may be located at circumferentially opposite positions or at positions separated by a predetermined angle. In the embodiment shown in FIGS. 1a and 1b, the nozzles 4 and 5 are circumferentially separated by 90 degrees, the circumferentially middle radius therebetween being opposite to the radius through the central axis of the cylinder 2a of the port 2, as shown in FIG. 1b.

A purge gas is introduced into the interior of the cap 1 through a pipe 4a attached to the nozzle 4, when the cap 1 is mounted on the bomb 10 and the fingers 3d of the handling member 3 are engaged with the grooves of the handle 12b of the valve 12. When the compressed gas contained in the bottle 11 of the bomb 10 is an inflammable or an ignitable gas, the purge gas introduced into the cap 1 is preferred to be an inert gas such as nitrogen gas, helium gas, argon gas, or carbon dioxide gas. When, on the other hand, the gas contained in the bottle 11 is a poisonous gas without inflammable or ignitable property, the purge gas is preferred to be air or an inert gas as enumerated above. Further, when the gas contained in the bottle 11 is a poisonous gas with an inflammable or an ignitable property, the purge gas is preferred to be an inert gas as enumerated above. The gas in the interior of the cap 1 is exhausted through the branched pipe 5a attached to the nozzle 5. A detector 6 for detecting the presence of the compressed gas in the bottle 11 in the exhausted purge gas is provided in the middle of one of the branches of the pipe 5a. Thus, the detector 6 can detect leakage of the compressed gas from the bottle 11 of the bomb 10. The detector 6 may be a gas chromatograph, or, when the compressed gas contained in the bottle 11 of the bomb 10 is a gas such as arsines and phosphines, the high sensitivity arsines phosphite monitor utilizing chemical luminescence. Further, when the gas in the bottle 11 is a gas like silanes or diborane, fixed voltage electrolytic gas detector may be used as the detector 6, and when the gas in the bottle 11 is a handle gas, a diaphragm electrode type gas leakage detector may be used as the detector 6.

The introduction of the purge gas and the detection of the leaking gas may be effected at fixed intervals, or at a time when it is deemed described. If the leaking of the compressed gas is detected by the detector 6, the valve 12 is closed by means of the handling member 3, and, after purging the inside of the cap 1 until no leaking gas is detected, the cap 1 is removed from the bomb 10 which is replaced by a new one. The new bomb 10 and the valve 12 is tested as to the leakage by repeating a similar process.

Figure 2A:
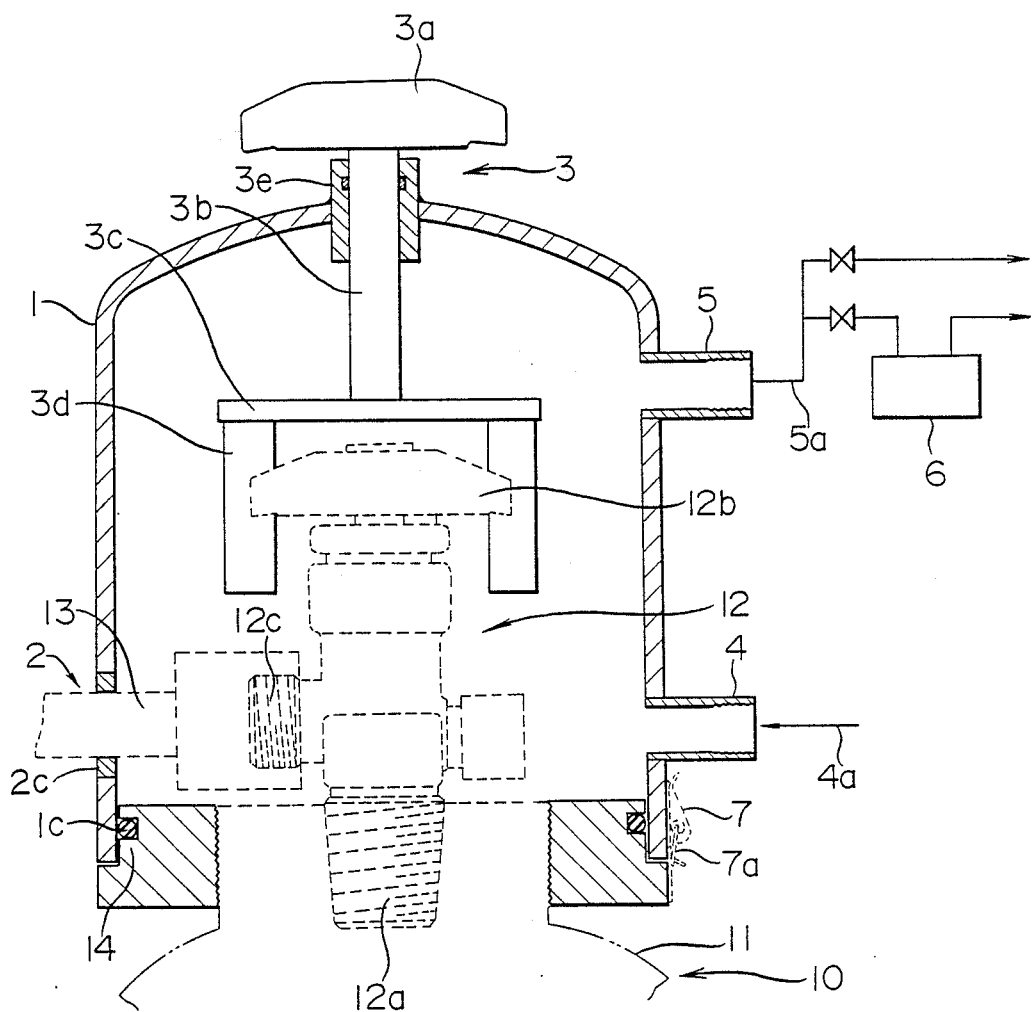
FIG. 2a is a view similar to that of FIG. 1a, but showing another safety device according to the present invention, showing a schematically synthesized cross section thereof along the lines A—A' and A—A" of FIG. 2b.
Figure 2B:
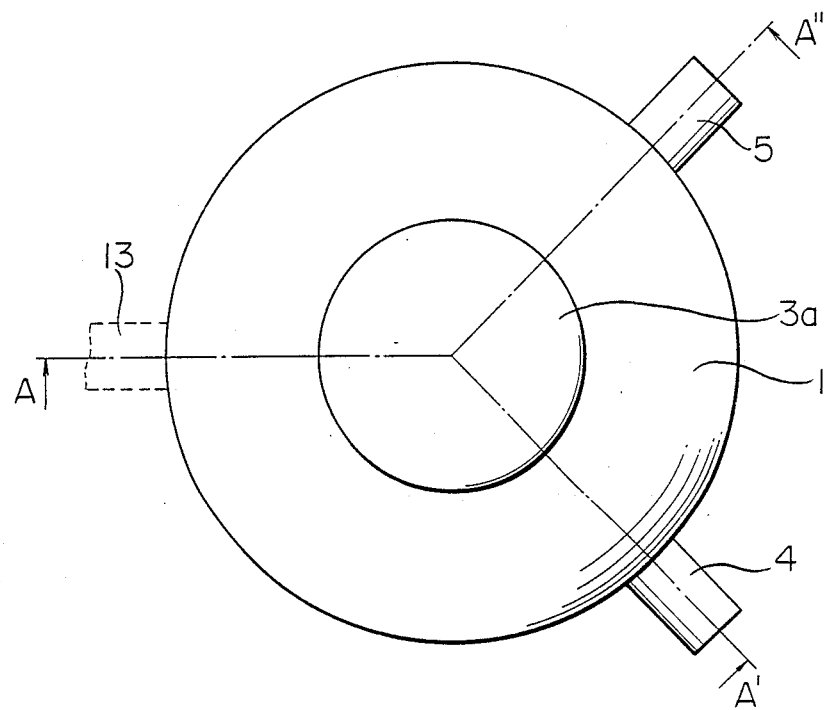

Referring now to FIGS. 1a and 2b of the drawings, the second embodiment according to the present invention is described. However, as the safety device of FIGS. 2a and 1b is similar to that of FIGS. 1a and 1b in structure and operation, the descripton thereof is omitted hereinbelow except for the differing points.

The attachment member 14 has the form of a short hollow cylinder, the female thread formed on the inner circumferential surface of the cylinder being screwed onto the male thread formed on the circumferential surface of the cylindrical neck portion of the bottle 11 of the bomb 10. An annular step is formed on the outer circumferential surface of the attachment member 14, to receive the lower end portion of the bell-shaped cap 1. A gasket 1c is provided in the annular groove formed on the stepped circumferential surface of the attachment member 14 and the bottom portion of the cap 1. The port 2 for the nozzle 13 comprises a sealing member 2c fitted in a U-shaped notch formed in the side wall of the cap 1, so that the nozzle 13 may extend through the sealing member 2c. The bell-shaped cap 1 is made of a single piece, and is attached to the member 14 by means of a plurality of circumferentially equally spaced clamps 7 which is turned upward to engage with the square ring 7a rotatably fixed on the attachment member 14. The attachment of the single-piece cap 1 is effected as follows.

Figure 3:
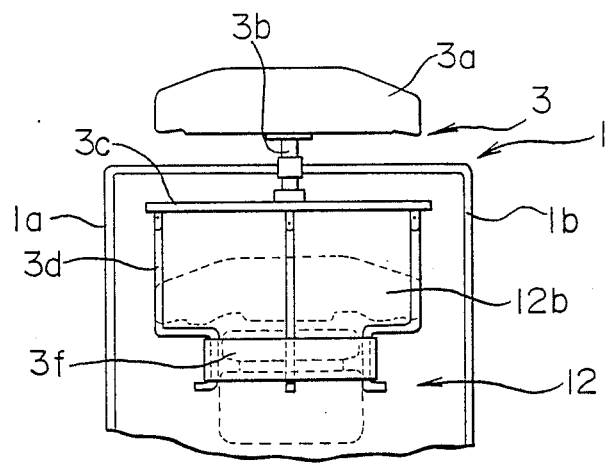
FIG. 3 is a partial elevational section view of still another safety device according to the present invention, showing the structure of the handling member thereof.

FIG. 3 shows a further structure of the handling member 3 which may be comprised in the safety device according to the present invention. The handling member shown in FIG. 3 comprises a disk-shaped handle 3a, a vertically extending shaft 3b fixed to the center of the lower surface of the handle 3a, a horizontal disk 3c fixed to the bottom end of the shaft 3b, four inwardly bent fingers 3d rotatably fixed to the lower surface of the disk 3c for engaging with the handle 12b of the valve 12, and an annular clip 3f for holding the lower bent portions of the fingers 3d. The shaft 3b extends through the annular sealing member 3e. The bell-shaped cap 1 shown in FIG. 3 is divided into two symmetric halves 1a and 1b which abut at a central vertically extending plane of symmetry which is perpendicular to the plane of the figure in FIG. 3. Thus, the attachment of the safety device comprising the handling member 3 shown in FIG. 3 is effected as follows. First, before the cap 1 is attached to the bomb, the fingers 3d are rotated around the upper end thereof with respect to the disk 3c so that the straight portions of the fingers 3d are engaged with the grooves on the circumference of the handle 12b of the valve 12, and the bent portions thereof are fitted around the cylindrical body of the valve 12, the inward bend following the back of the handle 12b. Then, the annular clip 3f is fitted around the bent portions of the fingers 3d to hold them tightly together. Thus, the engagement of the fingers 3d with the handle 12b is secured. Then, the left and right halves 1a and 1b of the bell-shaped cap 1 is attached to the top of the bottle of the bomb containing a compressed gas through the intermediary of an attachment member fixed around the neck portion of the bottle of the bomb to enclose the valve 12 therein, so that the sealing member 3e is fitted in the hole formed at the center of the circular ceiling of the cap 1. The attachment of the cap 1 to the bottle of the bomb and the coupling of the right and left halves 1a and 1b of the cap 1 may be effected by means of clamps similar to those shown in FIG. 2a.

Figure 4:
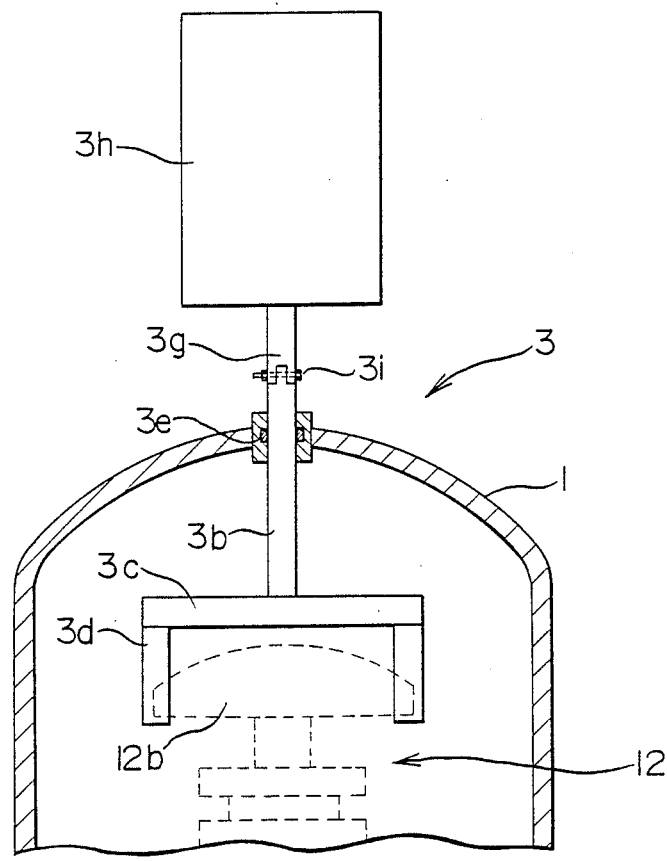
FIG. 4 is a view similar to that of FIG. 3, but showing another structure of the handling member which may be comprised in the safety device according to the present invention.

FIG. 4 shows another structure of the handling member 3 which may be comprised in the safety device according to the present invention. The safety device comprising the handling member 3 shown in FIG. 4 is similar to that shown in FIGS. 1a and 1b or that shown in FIGS. 2a and 2b. The handling member 3, however, comprises an actuator 3h which may be an electric motor or an air cylinder utilizing the air pressure as the driving force. The output shaft 3g of the actuator 3h is coupled to the vertically extending shaft 3b by means of a pin 3i. Otherwise, the handling member 3 has a structure similar to that of the member 3 shown in FIGS. 1a and 1b.

As the actuator 3h can be operated by a remote control system, the opening and closing of the valve 12, or the adjustment of the rotational position of the handle 12b, can be effected from a remote station. Thus, an operator has no need of approaching the bomb containing the compressed gas to control the flow of the gas through the valve 12.

What is claimed is:

1. A safety device for a vessel of compressed gases which comprises a cylindrical bottle containing a compressed gas and a valve secured to a top of the bottle and regulating a gas flow from the bottle by a rotational position of a handle, comprising:

enclosing means for hermetically enclosing said valve and a top portion of said bottle coupled to the valve, said enclosing means comprising a cap adapted to enclose the valve therein and having a bottom portion adapted to be detachably secured to said top portion of the bottle;

a port formed in a wall of said cap of the enclosing means, said port being adapted to pass therethrough a gas conveying tubular member attached to said valve from inside to outside of the cap;

handling means for adjusting said rotational position of the handle of said valve form outside of said cap, said handling means comprising engaging means for engaging with the handle of the valve and a shaft fixed to said engaging means and extending from inside to outside of said cap;

purge gas introducing means for introducing a purge gas into an interior of said cap; and purge gas exhausting means for exhausting said purge gas from the interior of said cap.

2. A safety device as claimed in claim 1, further comprising a detector means for detecting a presence of said compressed gas in exhausted purge gas, said detector means being operatively coupled to said purge gas/exhausing means.

3. A safety device as claimed in claim 2, wherein said engaging means of the handling means comprises a disk-shaped member and a plurality of circumferentially spaced fingers fixedly secured to the disk-shaped member at one end thereof, said shaft extending through and slidably supported by a ceiling of the cap.

4. A safety device as claimed in claim 2, wherein said engaging member of the handling means comprises a disk-shaped member, a plurality of inwardly bent circumferentially spaced fingers rotatably secured to the disk-shaped member at one end thereof, and annular clip means for holding inwardly bent portions of the fingers together at a back of said handle of the valve of the vessel, straight portions of the fingers being adapted to engage with a circumferential portion of said handle of the valve.

5. A safety device as claimed in claim 1, wherein said engaging means of the handling means comprises a dish-shaped member and a plurality of circumferentially spaced fingers fixedly secured to the disk-shaped member at one end thereof, said shaft extending through and slidably supported by a ceiling of the cap.

6. A safety device as claimed in claim 5, wherein said cap of the enclosing means is divided into a bell-shaped upper portion and a hollow cylindrical lower portion detachably secured to the upper portion.

7. A safety device as claimed in claim 3, further comprising an actuator means for rotating said shaft of the handling means, said actuator means comprising an actuator disposed outside of said cap and an output of the actuator operatively coupled to said shaft.

8. A safety device as claimed in claim 1, wherein said engaging of the handling means comprises a disk-shaped member, a plurality of inwardly bent circumferentially spaced fingers rotatably secured to the disk-shaped member at one end thereof, and annular clip means for holding inwardly bent portions of the fingers together at a back of said handle of the valve of the vessel, straight portions of the fingers being adapted to engage with a circumferential portion of said handle of the valve.

9. A safety device as claimed in claim 8, wherein said cap of the enclosing means is divided into symmetric halves abutting at a plane passing through an axis of the cap, said halves being detachably secured together.

10. A safety device as claimed in claim 8, further comprising an actuator means for rotating said shaft of the handling means, said actuator means comprising an actuator disposed outside of said cap and an output of the actuator operatively coupled to said shaft.

* * * * *